United States Patent
Barriac et al.

(10) Patent No.: US 9,838,940 B2
(45) Date of Patent: *Dec. 5, 2017

(54) PACKET TRANSMISSION DEFERRAL BASED ON BSSID INFORMATION

(71) Applicant: QUALCOMM Incorporated, San Diego, CA (US)

(72) Inventors: Gwendolyn Denise Barriac, Encinitas, CA (US); Simone Merlin, Solana Beach, CA (US); Hao Zhu, Ocala, FL (US); Srinivas Katar, Fremont, CA (US); Lawrence Winston Yonge, III, Summerfield, FL (US); Chao Zou, Ocala, FL (US); Bin Tian, San Diego, CA (US); Yan Zhou, San Diego, CA (US); Hemanth Sampath, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 14/487,019

(22) Filed: Sep. 15, 2014

(65) Prior Publication Data

US 2015/0078299 A1    Mar. 19, 2015

Related U.S. Application Data

(60) Provisional application No. 61/879,572, filed on Sep. 18, 2013.

(51) Int. Cl.
*H04W 4/00* (2009.01)
*H04W 40/02* (2009.01)
(Continued)

(52) U.S. Cl.
CPC ........ *H04W 40/02* (2013.01); *H04W 74/006* (2013.01); *H04W 88/08* (2013.01);
(Continued)

(58) Field of Classification Search
CPC ... H04W 40/02; H04W 74/006; H04W 88/08; H04W 48/16; H04W 48/08; H04W 74/0808; H04W 84/12
See application file for complete search history.

(56) References Cited

U.S. PATENT DOCUMENTS

| 6,147,978 A | 11/2000 | John et al. | |
|---|---|---|---|
| 2006/0285528 A1* | 12/2006 | Gao | H04W 52/0229 370/338 |

(Continued)

FOREIGN PATENT DOCUMENTS

| WO | WO-1998031139 | 7/1998 |
|---|---|---|
| WO | WO-2013033692 A1 | 3/2013 |

(Continued)

OTHER PUBLICATIONS

Co-pending U.S. Appl. No. 14/321,331, filed Jul. 1, 2014.

(Continued)

*Primary Examiner* — Abdelnabi O Musa
(74) *Attorney, Agent, or Firm* — Patterson & Sheridan, LLP

(57) ABSTRACT

Aspects of the present disclosure provide techniques and apparatus for deferral based on basic service set identification (BSSID) information. According to certain aspects, a method for wireless communications is provided. The method generally includes receiving, on a shared access medium, a packet having at least one deferral-related parameter and deciding whether to defer transmission on the shared access medium based, at least in part, on the deferral-related parameter. Another method may generally include (Continued)

generating a packet comprising at least one deferral-related parameter to be used by another apparatus for deciding whether or not the other apparatus should defer transmitting on a shared access medium and providing the packet to the other apparatus.

30 Claims, 7 Drawing Sheets

(51) Int. Cl.
    *H04W 88/08*     (2009.01)
    *H04W 74/00*     (2009.01)
    *H04W 48/08*     (2009.01)
    *H04W 74/08*     (2009.01)
    *H04W 84/12*     (2009.01)
    *H04W 48/16*     (2009.01)

(52) U.S. Cl.
    CPC ............ *H04W 48/08* (2013.01); *H04W 48/16* (2013.01); *H04W 74/0808* (2013.01); *H04W 84/12* (2013.01)

(56) References Cited

U.S. PATENT DOCUMENTS

| | | | |
|---|---|---|---|
| 2007/0133489 A1* | 6/2007 | Ramesh | H04W 74/0866 370/338 |
| 2007/0171933 A1* | 7/2007 | Sammour | H04W 74/0816 370/447 |
| 2011/0103352 A1* | 5/2011 | Wentink | H04W 74/008 370/336 |
| 2011/0222408 A1 | 9/2011 | Kasslin et al. | |
| 2012/0051312 A1 | 3/2012 | Noh et al. | |
| 2012/0230310 A1* | 9/2012 | Roy | H04W 74/0808 370/338 |
| 2013/0155976 A1* | 6/2013 | Chen | H04W 72/0453 370/329 |
| 2013/0235737 A1* | 9/2013 | Merlin | H04W 74/0808 370/252 |
| 2014/0071959 A1* | 3/2014 | Ghosh | H04W 72/0426 370/336 |
| 2015/0078299 A1* | 3/2015 | Barriac | H04W 74/006 370/329 |
| 2015/0131640 A1* | 5/2015 | Seok | H04W 28/06 370/338 |
| 2015/0359008 A1* | 12/2015 | Wang | H04W 74/004 370/330 |

FOREIGN PATENT DOCUMENTS

| | | |
|---|---|---|
| WO | WO-2013048520 A1 | 4/2013 |
| WO | WO-2014064610 A1 | 5/2014 |
| WO | WO-2014179608 | 11/2014 |

OTHER PUBLICATIONS

Co-pending U.S. Appl. No. 14/527,533, filed Oct. 29, 2014.
International Search Report and Written Opinion—PCT/US2014/055793—ISA/EPO—dated Dec. 18, 2014.

* cited by examiner

PACKET TRANSMISSION DEFERRAL BASED ON BSSID INFORMATION

CROSS-REFERENCE TO RELATED APPLICATION(S)

This application claims benefit of U.S. Provisional Patent Application Ser. No. 61/879,572, filed Sep. 18, 2013, which is herein incorporated by reference in its entirety.

BACKGROUND

Field of the Disclosure

Aspects of the present disclosure relate generally to wireless communications, and more specifically, to systems, methods, and devices for deferral based on basic service set identification (BSSID) information.

Description of Related Art

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide an apparatus for wireless communications. The apparatus generally includes a processing system configured to obtain at least one deferral-related parameter from a packet transmitted on a shared access medium and decide whether to defer transmission on the shared access medium based, at least in part, on the at least one deferral-related parameter.

Certain aspects of the present disclosure provide an apparatus for wireless communications. The apparatus generally includes a processing system configured to generate a packet comprising at least one deferral-related parameter to be used by another apparatus for deciding whether or not the other apparatus should defer transmitting on a shared access medium and provide the packet to the other apparatus; and an interface configured to output the packet for transmission to the other apparatus.

Certain aspects of the present disclosure provide an apparatus for wireless communications. The apparatus generally includes means for obtaining at least one deferral-related parameter from a packet transmitted on a shared access medium and means for deciding whether to defer transmission on the shared access medium based, at least in part, on the at least one deferral-related parameter.

Certain aspects of the present disclosure provide an apparatus for wireless communications. The apparatus generally includes means for generating a packet comprising at least one deferral-related parameter to be used by another apparatus for deciding whether or not the other apparatus should defer transmitting on a shared access medium and means for outputting the packet for transmission to the other apparatus.

Certain aspects of the present disclosure provide a method for wireless communications. The method generally includes obtaining at least one deferral-related parameter from a packet transmitted on a shared access medium and deciding whether to defer transmission on the shared access medium based, at least in part, on the at least one deferral-related parameter.

Certain aspects of the present disclosure provide a method for wireless communications. The method generally includes generating a packet comprising at least one deferral-related parameter to be used by another apparatus for deciding whether or not the other apparatus should defer transmitting on a shared access medium and providing the packet to the other apparatus; and outputting the packet for transmission to the other apparatus.

Certain aspects of the present disclosure provide a computer program product for wireless communications. The computer program product generally includes a computer-readable medium having instructions stored thereon, the instructions executable by an apparatus for obtaining at least one deferral-related parameter from a packet transmitted on a shared access medium and deciding whether to defer transmission on the shared access medium based, at least in part, on the at least one deferral-related parameter.

Certain aspects of the present disclosure provide a computer program product for wireless communications. The computer program product generally includes a computer-readable medium having instructions stored thereon, the instructions executable by an apparatus for generating a packet comprising at least one deferral-related parameter to be used by another apparatus for deciding whether or not the other apparatus should defer transmitting on a shared access medium providing the packet to the other apparatus; and outputting the packet for transmission to the other apparatus.

Certain aspects of the present disclosure provide a wireless node. The wireless node generally includes a receiver configured to receive on a shared access medium, a packet having at least one deferral-related parameter and a processing system configured to decide whether to defer transmission on the shared access medium based, at least in part, on the deferral-related parameter.

Certain aspects of the present disclosure provide a wireless node. The wireless node generally includes a processing system configured to generate a packet having at least one deferral-related parameter for a receiving device to use in deciding whether or not to defer transmitting on a shared access medium and a transmitter configured to transmit the packet on the shared access medium.

Numerous other aspects are provided including methods, apparatus, systems, computer program products, and processing systems.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
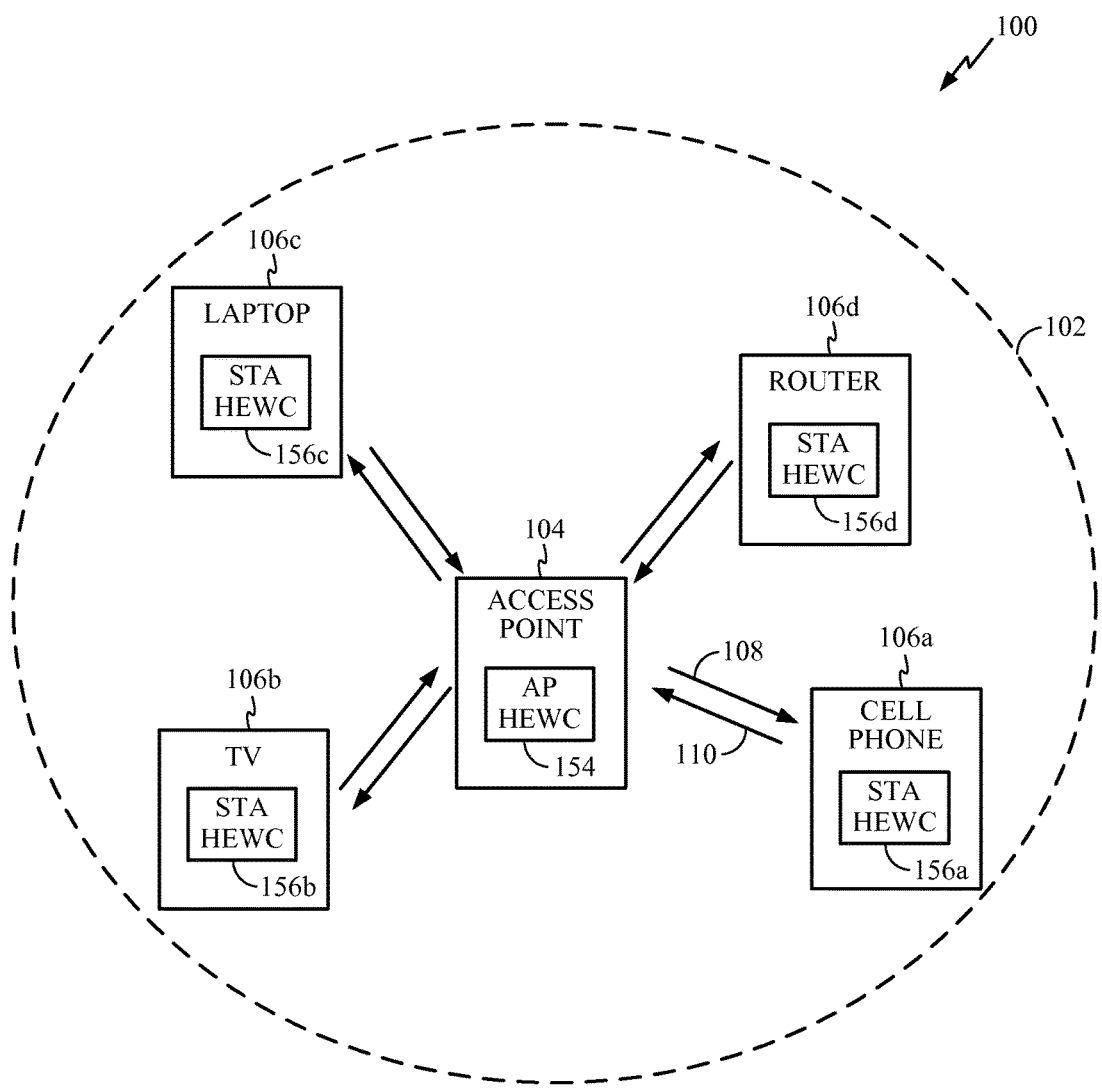
FIG. 1 illustrates an exemplary wireless communication system in which aspects of the present disclosure may be employed, in accordance with certain aspects of the present disclosure.

Aspects of the present disclosure relate generally to wireless communications, and more specifically, to systems, methods, and devices for deferral based on basic service set identification (BSSID) information. For example, BSSID information can be included in packets along with station identifiers. According to certain aspects, different deferral rules may be applied depending on the source and/or destination of the packet (e.g., whether it is from within the same basic service set (BSS) or from an overlapping BSS (OBSS)). According to certain aspects, different deferral rules may be applied based on whether access points (APs) are coordinated or uncoordinated in time and/or frequency.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing the high-efficiency 802.11 protocol using the techniques disclosed herein may include allowing for increased peer-to-peer services (e.g., Miracast, WiFi Direct Services, Social WiFi, etc.) in the same area, supporting increased per-user minimum throughput requirements, supporting more users, providing improved outdoor coverage and robustness, and/or consuming less power than devices implementing other wireless protocols.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement a high-efficiency 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Example Wireless Communication Systems

FIG. 1 illustrates an exemplary wireless communication system 100 in which aspects of the present disclosure may be employed, in accordance with certain aspects of the present disclosure. The wireless communication system 100 may operate pursuant to a wireless standard, for example a high-efficiency 802.11 standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with code division multiple access (CDMA) techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

In some aspects, a STA 106 may be required to associate with the AP 104 in order to send communications to and/or receive communications from the AP 104. In one aspect, information for associating is included in a broadcast by the AP 104. To receive such a broadcast, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

In an embodiment, the AP 104 includes an AP high-efficiency wireless component (HEWC) 154. The AP HEWC 154 may perform some or all of the operations described herein to enable communications between the AP 104 and the STAs 106 using the high-efficiency 802.11 protocol. The functionality of the AP HEWC 154 is described in greater detail below with respect to FIGS. 2B, 3, 4, and 5.

Alternatively or in addition, the STAs 106 may include a STA HEWC 156. The STA HEWC 156 may perform some or all of the operations described herein to enable communications between the STAs 106 and the AP 104 using the high-frequency 802.11 protocol. The functionality of the STA HEWC 156 is described in greater detail below with respect to FIGS. 2-6A.

Figure 2A:
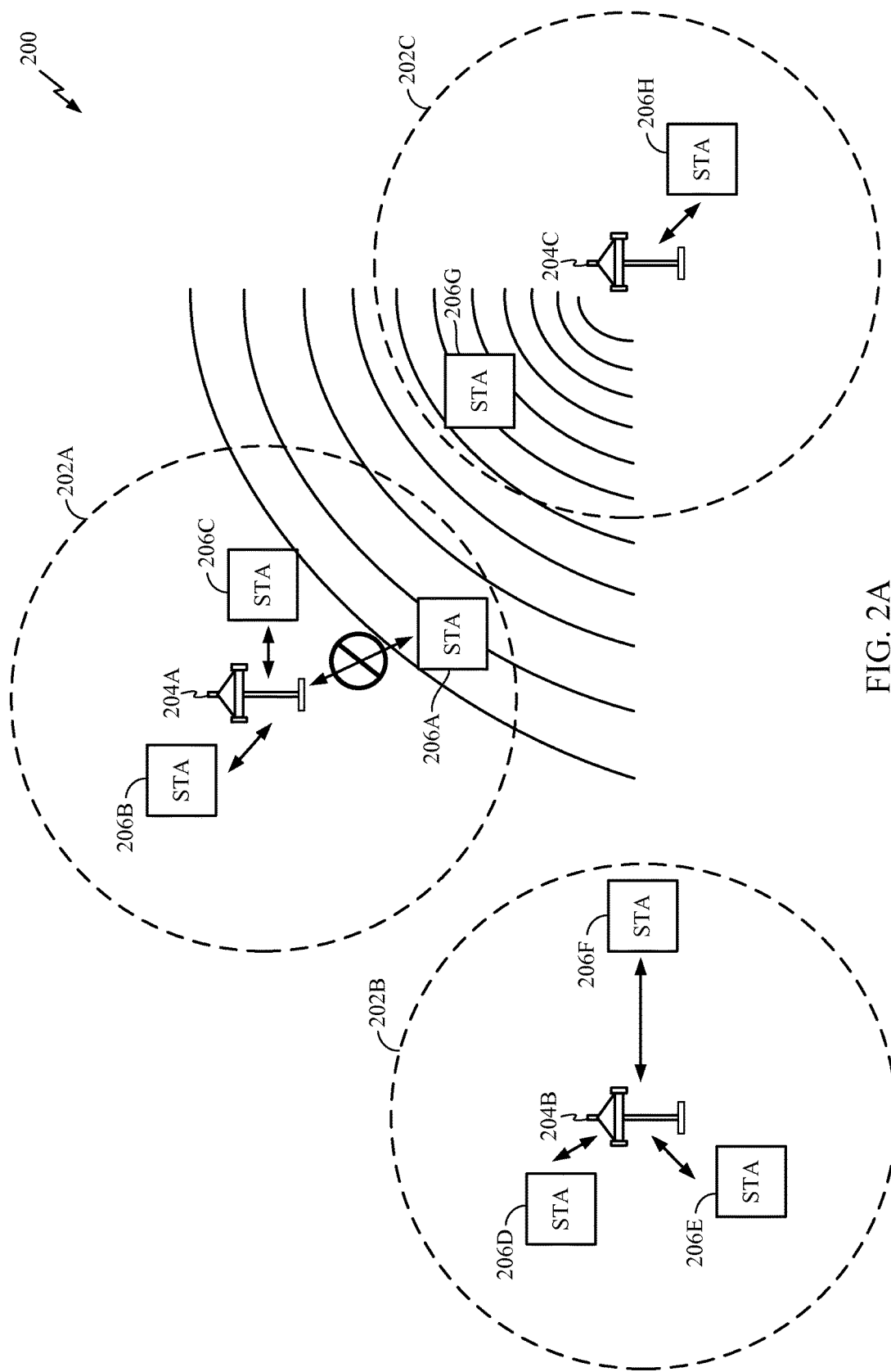
FIG. 2A illustrates an exemplary wireless communication system in which multiple wireless communication networks are present, in accordance with certain aspects of the present disclosure.

In some circumstances, a BSA may be located near other BSAs. For example, FIG. 2A shows a wireless communication system 200 in which multiple wireless communication networks are present, in accordance with certain aspects of the present disclosure. As illustrated in FIG. 2A, BSAs 202A, 202B, and 202C may be physically located near each other. Despite the close proximity of the BSAs 202A-C, the APs 204A-C and/or STAs 206A-H may each communicate using the same spectrum. Thus, if a device in the BSA 202C (e.g., the AP 204C) is transmitting data, devices outside the BSA 202C (e.g., APs 204A-B or STAs 206A-F) may sense the communication on the medium.

Generally, wireless networks that use a regular 802.11 protocol (e.g., 802.11a, 802.11b, 802.11g, 802.11n, etc.) operate under a carrier sense multiple access (CSMA) mechanism for medium access. According to CSMA, devices sense the medium and only transmit when the medium is sensed to be idle. Thus, if the APs 204A-C and/or STAs 206A-H are operating according to the CSMA mechanism and a device in the BSA 202C (e.g., the AP 204C) is transmitting data, then the APs 204A-B and/or STAs 206A-F outside of the BSA 202C may not transmit over the medium even though they are part of a different BSA.

FIG. 2A illustrates such a situation. As illustrated in FIG. 2A, AP 204C is transmitting over the medium. The transmission is sensed by STA 206G, which is in the same BSA 202C as the AP 204C, and by STA 206A, which is in a different BSA than the AP 204C. While the transmission may be addressed to the STA 206G and/or only STAs in the BSA 202C, STA 206A nonetheless may not be able to transmit or receive communications (e.g., to or from the AP 204A) until the AP 204C (and any other device) is no longer transmitting on the medium. Although not shown, the same may apply to STAs 206D-F in the BSA 202B and/or STAs 206B-C in the BSA 202A as well (e.g., if the transmission by the AP 204C is stronger such that the other STAs can sense the transmission on the medium).

The use of the CSMA mechanism then creates inefficiencies because some APs or STAs outside of a BSA may be able to transmit data without interfering with a transmission made by an AP or STA in the BSA. As the number of active wireless devices continues to grow, the inefficiencies may begin to significantly affect network latency and throughput. For example, significant network latency issues may appear in apartment buildings, in which each apartment unit may include an access point and associated stations. In fact, each apartment unit may include multiple access points, as a resident may own a wireless router, a video game console with wireless media center capabilities, a television with wireless media center capabilities, a cell phone that can act like a personal hot-spot, and/or the like. Correcting the inefficiencies of the CSMA mechanism may then be vital to avoid latency and throughput issues and overall user dissatisfaction.

Such latency and throughput issues may not even be confined to residential areas. For example, multiple access points may be located in airports, subway stations, and/or other densely-populated public spaces. Currently, WiFi access may be offered in these public spaces, but for a fee. If the inefficiencies created by the CSMA mechanism are not corrected, then operators of the wireless networks may lose customers as the fees and lower quality of service begin to outweigh any benefits.

Accordingly, the high-efficiency 802.11 protocol described herein may allow for devices to operate under a modified mechanism that minimizes these inefficiencies and increases network throughput. Such a mechanism is described below with respect to FIGS. 2B, 3, and 4. Additional aspects of the high-efficiency 802.11 protocol are described below with respect to FIGS. 5-9.

Figure 2B:
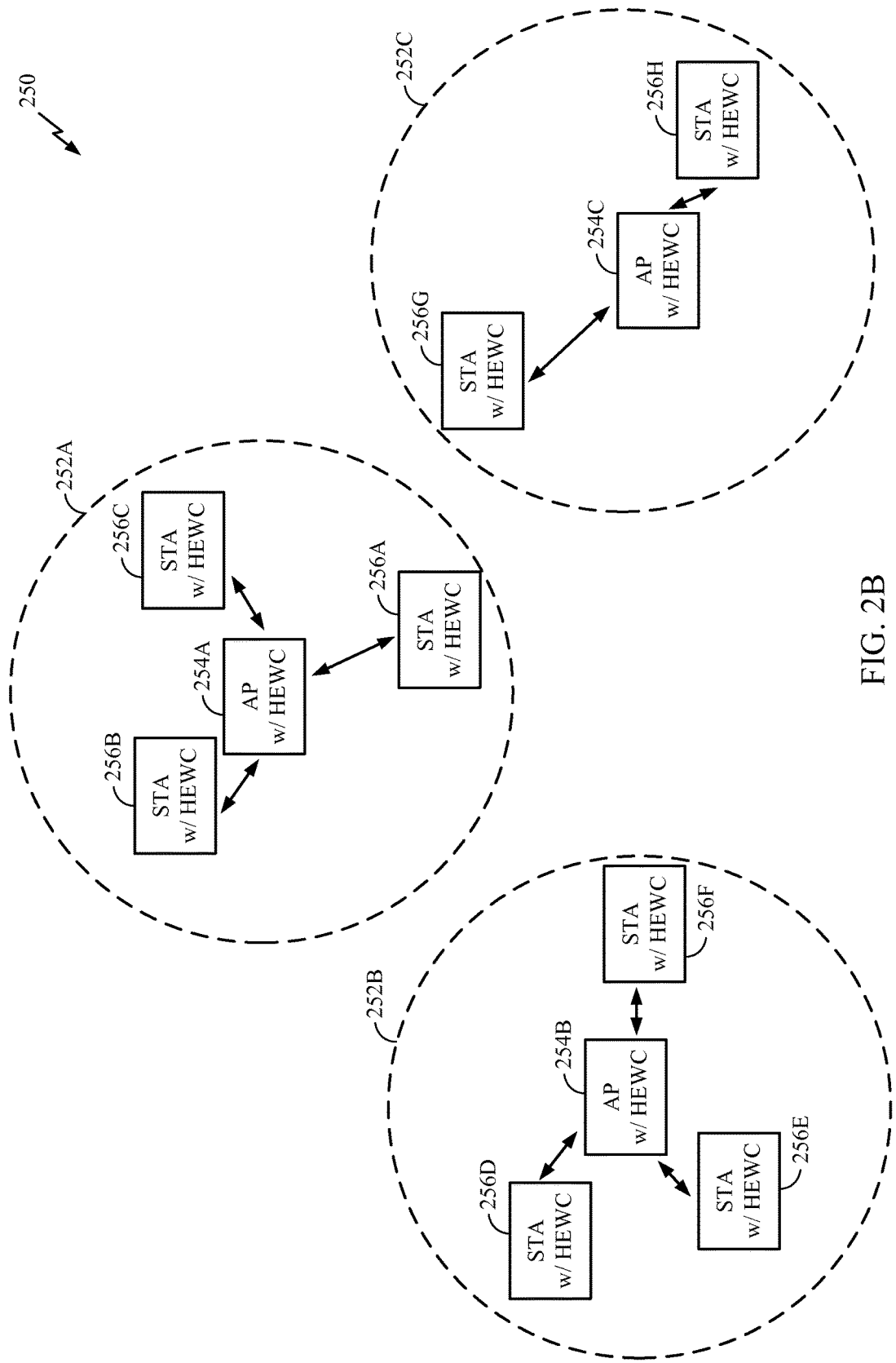
FIG. 2B illustrates an exemplary wireless communication system in which multiple wireless communication networks are present, in accordance with certain aspects of the present disclosure.

FIG. 2B illustrates a wireless communication system 250 in which multiple wireless communication networks are present, in accordance with certain aspects of the present disclosure. Unlike the wireless communication system 200 of FIG. 2A, the wireless communication system 250 may operate pursuant to the high-efficiency 802.11 standard discussed herein. The wireless communication system 250 may include an AP 254A, an AP 254B, and an AP 254C. The AP 254A may communicate with STAs 256A-C, the AP 254B may communicate with STAs 256D-F, and the AP 254C may communicate with STAs 256G-H.

A variety of processes and methods may be used for transmissions in the wireless communication system 250 between the APs 254A-C and the STAs 256A-H. For example, signals may be sent and received between the APs 254A-C and the STAs 256A-H in accordance with OFDM/OFDMA techniques or CDMA techniques.

The AP 254A may act as a base station and provide wireless communication coverage in a BSA 252A. The AP 254B may act as a base station and provide wireless communication coverage in a BSA 252B. The AP 254C may act as a base station and provide wireless communication coverage in a BSA 252C. It should be noted that each BSA 252A, 252B, and/or 252C may not have a central AP 254A, 254B, or 254C, but rather may allow for peer-to-peer communications between one or more of the STAs 256A-H. Accordingly, the functions of the AP 254A-C described herein may alternatively be performed by one or more of the STAs 256A-H.

According to certain aspects, the APs 254A-C and/or STAs 256A-H include a high-efficiency wireless component. As described herein, the high-efficiency wireless component may enable communications between the APs and STAs using the high-efficiency 802.11 protocol. In particular, the high-efficiency wireless component may enable the APs 254A-C and/or STAs 256A-H to use a modified mechanism that minimizes the inefficiencies of the CSMA mechanism (e.g., enables concurrent communications over the medium in situations in which interference would not occur). The high-efficiency wireless component is described in greater detail below with respect to FIG. 4.

As illustrated in FIG. 2B, the BSAs 252A-C are physically located near each other. When, for example, AP 254A and STA 256B are communicating with each other, the communication may be sensed by other devices in BSAs 252B-C. However, the communication may only interfere with certain devices, such as STA 256F and/or STA 256G. Under CSMA, AP 254B would not be allowed to communicate with STA 256E even though such communication would not interfere with the communication between AP 254A and STA 256B. Thus, the high-efficiency 802.11 protocol operates under a modified mechanism that differentiates between devices that can communicate concurrently and devices that cannot communicate concurrently. Such classification of devices may be performed by the high-efficiency wireless component in the APs 254A-C and/or the STAs 256A-H.

According to certain aspects, the determination of whether a device can communicate concurrently with other devices is based on a location of the device. For example, a STA that is located near an edge of the BSA may be in a state or condition such that the STA cannot communicate concurrently with other devices. As illustrated in FIG. 2B, STAs 206A, 206F, and 206G may be devices that are in a state or condition in which they cannot communicate concurrently with other devices. Likewise, a STA that is located near the center of the BSA may be in a station or condition such that the STA can communicate concurrently with other devices. As illustrated in FIG. 2, STAs 206B, 206C, 206D, 206E, and 206H may be devices that are in a state or condition in which they can communicate concurrently with other devices. Note that the classification of devices is not permanent. Devices may transition between being in a state or condition such that they can communicate concurrently and being in a state or condition such that they cannot communicate concurrently (e.g., devices may change states or conditions when in motion, when associating with a new AP, when disassociating, etc.).

Furthermore, devices may be configured to behave differently based on whether they are ones that are or are not in a state or condition to communicate concurrently with other devices. For example, devices that are in a state or condition such that they can communicate concurrently may communicate within the same spectrum. However, devices that are in a state or condition such that they cannot communicate concurrently may employ certain techniques, such as spatial multiplexing or frequency domain multiplexing, in order to communicate over the medium. The controlling of the behavior of the devices may be performed by the high-efficiency wireless component in the APs 254A-C and/or the STAs 256A-H.

According to certain aspects, devices that are in a state or condition such that they cannot communicate concurrently use spatial multiplexing techniques to communicate over the medium. For example, power and/or other information may be embedded within the preamble of a packet transmitted by another device. A device in a state or condition such that the device cannot communicate concurrently may analyze the preamble when the packet is sensed on the medium and decide whether or not to transmit based on a set of rules.

Figure 3:
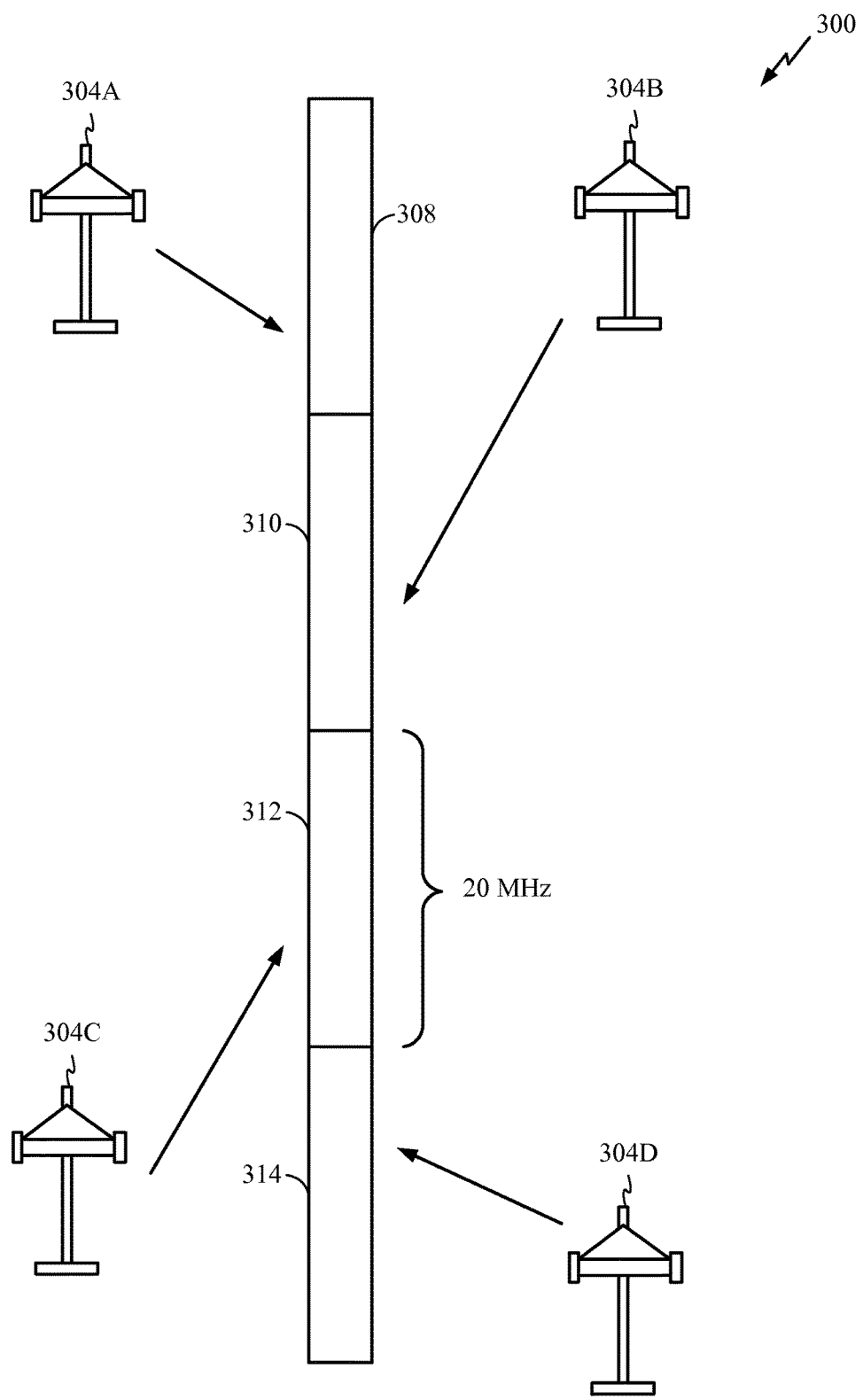
FIG. 3 illustrates example frequency multiplexing techniques that may be employed within the wireless communication systems of FIGS. 1 and 2B, in accordance with certain aspects of the present disclosure.

According to certain aspects, devices that are in a state or condition such that they cannot communicate concurrently use frequency domain multiplexing techniques to communicate over the medium. FIG. 3 illustrates example frequency multiplexing techniques that may be employed within the wireless communication system 100 of FIG. 1 and wireless communication system 250 of FIG. 2B, in accordance with certain aspects of the present disclosure. As illustrated in FIG. 3, an AP 304A, 304B, 304C, and 304D may be present within a wireless communication system 300. Each of the APs 304A, 304B, 304C, and 304D may be associated with a different BSA and include the high-efficiency wireless component described herein.

As an example, the bandwidth of the communication medium may be 80 MHz. Under the regular 802.11 protocol, each of the APs 304A, 304B, 304C, and 304D and the STAs associated with each respective AP attempt to communicate using the entire bandwidth, which can reduce throughput. However, under the high-efficiency 802.11 protocol using frequency domain multiplexing, the bandwidth may be divided into four 20 MHz segments 308, 310, 312, and 314 (e.g., channels), as illustrated in FIG. 3. The AP 304A may be associated with segment 308, the AP 304B may be associated with segment 310, the AP 304C may be associated with segment 312, and the AP 304D may be associated with segment 314.

In an embodiment, when the APs 304A-D and the STAs that are in a state or condition such that the STAs can communicate concurrently with other devices (e.g., STAs near the center of the BSA) are communicating with each other, then each AP 304A-D and each of these STAs may communicate using a portion of or the entire 80 MHz medium. However, when the APs 304A-D and the STAs that are in a state or condition such that the STAs cannot communicate concurrently with other devices (e.g., STAs near the edge of the BSA) are communicating with each other, then AP 304A and its STAs communicate using 20 MHz segment 308, AP 304B and its STAs communicate using 20 MHz segment 310, AP 304C and its STAs communicate using 20 MHz segment 312, and AP 304D and its STAs communicate using 20 MHz segment 314. Because the segments 308, 310, 312, and 314 are different portions of the communication medium, a first transmission using a first segment would not interference with a second transmission using a second segment.

Thus, APs and/or STAs, even those that are in a state or condition such that they cannot communicate concurrently with other devices when following 11ac or older protocols, if they include the high-efficiency wireless component, they can communicate concurrently with other APs and STAs without interference. Accordingly, the throughput of the wireless communication system 300 may be increased. In the case of apartment buildings or densely-populated public spaces, APs and/or STAs that use the high-efficiency wireless component may experience reduced latency and increased network throughput even as the number of active wireless devices increases, thereby improving user experience.

Figure 4:
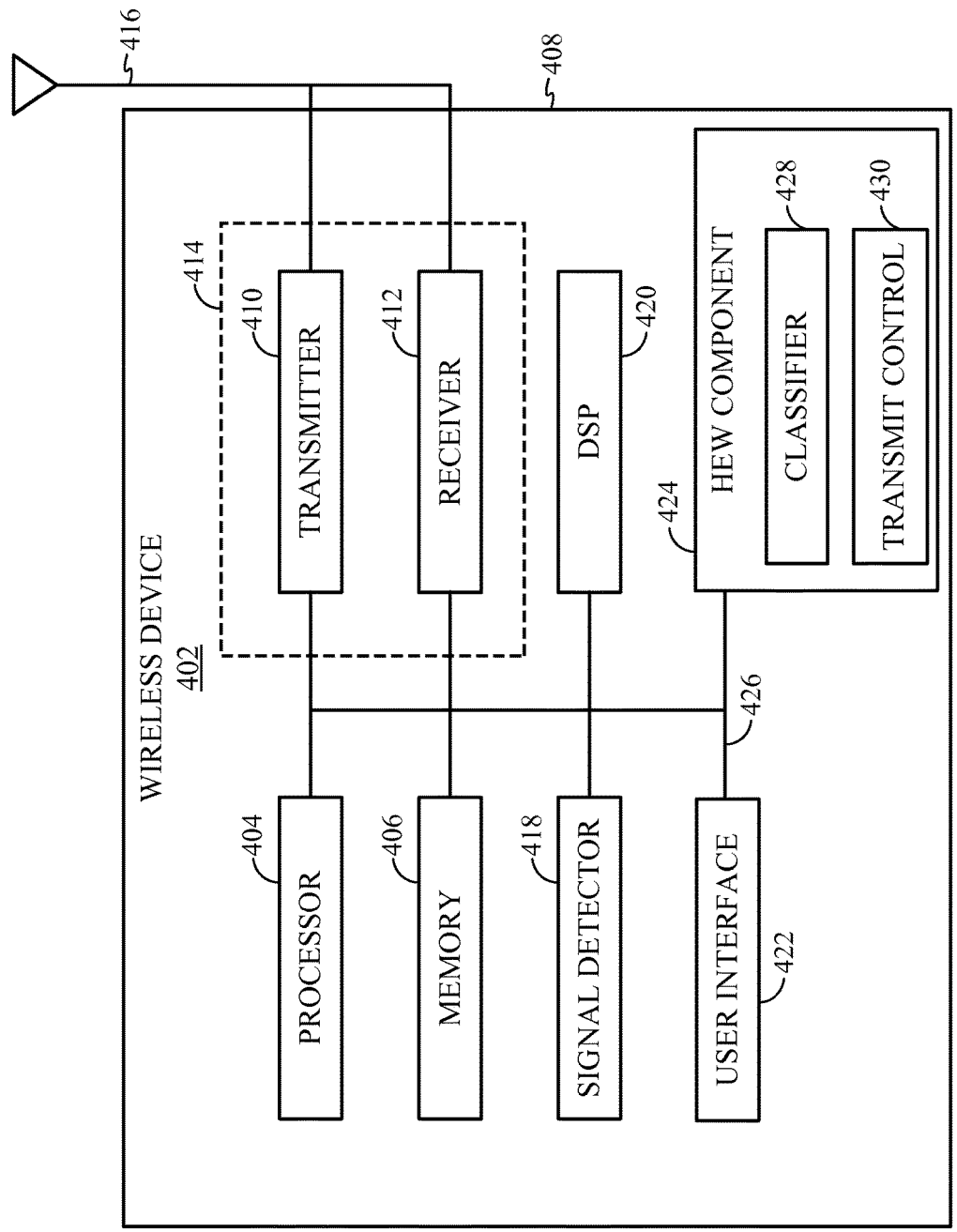
FIG. 4 illustrates a functional block diagram of an exemplary wireless device that may be employed within the wireless communication systems of FIGS. 1, 2B, and 3, in accordance with certain aspects of the present disclosure.

FIG. 4 shows an exemplary functional block diagram of a wireless device 402 (e.g., HEW component) that may be employed within the wireless communication system 100 of FIG. 1, wireless communication system 250 of FIG. 2B, and/or wireless communication system 300 of FIG. 3. The wireless device 402 is an example of a device that may be configured to implement the various methods described herein. For example, the wireless device 402 may comprise the AP 104, one of the STAs 106, one of the APs 254, one of the STAs 256, and/or one of the APs 304.

The wireless device 402 may include a processor 404 which controls operation of the wireless device 402. The processor 404 may also be referred to as a central processing unit (CPU). Memory 406, which may include both read-only memory (ROM) and random access memory (RAM), may provide instructions and data to the processor 404. A portion of the memory 406 may also include non-volatile random access memory (NVRAM). The processor 404 typically performs logical and arithmetic operations based on program instructions stored within the memory 406. The instructions in the memory 406 may be executable to implement the methods described herein.

The processor 404 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 402 may also include a housing 408 that may include a transmitter 410 and/or a receiver 412 to allow transmission and reception of data between the wireless device 402 and a remote location. The transmitter 410 and receiver 412 may be combined into a transceiver 414. An antenna 416 may be attached to the housing 408 and electrically coupled to the transceiver 414. The wireless device 402 may also include (not shown) multiple transmitters, multiple receivers, multiple transceivers, and/or multiple antennas.

The wireless device 402 may also include a signal detector 418 that may be used in an effort to detect and quantify the level of signals received by the transceiver 414. The signal detector 418 may detect such signals as total energy, energy per subcarrier per symbol, power spectral density and other signals. The wireless device 402 may also include a digital signal processor (DSP) 420 for use in processing signals. The DSP 420 may be configured to generate a packet for transmission. In some aspects, the packet may comprise a physical layer data unit (PPDU).

The wireless device 402 may further comprise a user interface 422 in some aspects. The user interface 422 may comprise a keypad, a microphone, a speaker, and/or a display. The user interface 422 may include any element or component that conveys information to a user of the wireless device 402 and/or receives input from the user.

The wireless devices 402 may further comprise a high-efficiency wireless component 424 in some aspects. The high-efficiency wireless component 424 may include a classifier unit 428 and a transmit control unit 430. As described herein, the high-efficiency wireless component 424 may enable APs and/or STAs to use a modified mechanism that minimizes the inefficiencies of the CSMA mechanism (e.g., enables concurrent communications over the medium in situations in which interference would not occur).

The modified mechanism may be implemented by the classifier unit 428 and the transmit control unit 430. In an embodiment, the classifier unit 428 determines which devices are in a state or condition such that they can communicate concurrently with other devices and which devices are in a state or condition such that they cannot communicate concurrently with other devices without additional orthogonalization in time, frequency, or space. In an embodiment, the transmit control unit 430 controls the behavior of devices. For example, the transmit control unit 430 may allow certain devices to transmit concurrently on the same medium and allow other devices to transmit using a spatial multiplexing or frequency domain multiplexing technique. The transmit control unit 430 may control the behavior of devices based on the determinations made by the classifier unit 428.

The various components of the wireless device 402 may be coupled together by a bus system 426. The bus system 426 may include a data bus, for example, as well as a power bus, a control signal bus, and a status signal bus in addition to the data bus. Those of skill in the art will appreciate the components of the wireless device 402 may be coupled together or accept or provide inputs to each other using some other mechanism.

Although a number of separate components are illustrated in FIG. 4, those of skill in the art will recognize that one or more of the components may be combined or commonly implemented. For example, the processor 404 may be used to implement not only the functionality described above with respect to the processor 404, but also to implement the functionality described above with respect to the signal detector 418 and/or the DSP 420. Further, each of the components illustrated in FIG. 4 may be implemented using a plurality of separate elements.

In some implementations, resources and operational modes of APs/STAs in networks with dense deployments of multiple BSSs are coordinated to reduce interference. In some aspects, one or more dimensions including time, frequency, space, and power are coordinated between APs/STAs. In some aspects, coordination messages are sent between APs/STAs. In some aspects, specific enhancements to 802.11ah scheduling and 802.11aa coordination protocol are employed.

Coordination can be achieved as explicit communication across APs/STAs of different BSSs. For example, via messages exchanged over the air or messages exchanged over a separate communication mean (e.g., cable backhaul connection). Messages can be exchanged directly between APs, between APs via STAs, directly between STAs, or between STAs via AP.

Coordination can be achieved as implicit communications/measurements based on observation of the traffic on the medium. For example, packets may be enhanced to carry partial information that can help the coordination Coordination final decisions can be made by a central informed controller, at each AP, with a distributed heuristic, or at each STA, based on exchanged info.

Example Deferral Rule Enhancements

There may be cases in certain WiFi networks where it is beneficial for nodes in overlapping basic service sets (OBSSs) to transmit concurrently. However, current WiFi standards may have strict deferral rules. Additionally, it may be desirable for a node to know whether a packet is from an access point (AP) in an OBSS or from an AP within the node's own BSS. This information may be useful in implementing new deferral rules for the purpose of allowing concurrent transmissions across OBSSs.

Currently, there are limitations to spatial reuse. In some cases, deferral rules may be conservative. For example, a network allocation vector (NAV) or a clear channel assessment (CCA) may be set, preventing transmissions that would be acceptable. Physical (PHY) CCA (energy or packet detect) levels may be fixed by standard and, therefore, not adaptable to conditions. Virtual carrier sensing (NAV) may be effectively active at the same sensitivity level of the payload modulation and coding scheme (MCS) where the NAV may be sent. In other cases, deferral rules may be aggressive. For example, NAV or CCA may allow transmissions that should not have occurred. NAV may not be decoded because the frame failed signal (SIG) or Data portions. Preamble detection may not be triggered because signal-to-noise-plus-interference ratio (SINR) may not sufficient. Additionally, packet detection and/or energy detection (ED) levels may be too high for the specific interference scenario.

In yet other cases, irrespective of CCA/NAV levels, a node may be receiving 'useless' packets. Useless packets may be packets that are not intended for the receiver or useless packets may be packets that are too weak for the payload to be decoded.

Thus, it is desirable to have deferral rules which can be implemented once a node is able to differentiate between packets originating from its own BSS and packets originating from OBSSs. Certain aspects of this disclosure discuss techniques and apparatus for enabling a node to perform such differentiation.

Certain aspects of this disclosure describe enhancements of deferral rules. According to certain aspects, CCA behavior may be improved. For example, deferral related indications may be included in every transmitted packet (e.g., in PHY preamble). Parameter values may be decided by the transmitting station (STA) (e.g., one of the STAs 256 illustrated in FIG. 3) or by the AP (e.g., one of the APs 254 illustrated in FIG. 3). According to certain aspects, the deferral related indications included in every transmitted packet may include one or more of the following: an identifier of the BSS, an identifier of the transmitter, an identifier of the receiver of the packet, a transmitter (TX) power indication, an indication of the 'importance' of the packet (whether it can be dropped or not), an indication of the quality of service (QoS) of the packet, or an indication of the RX power level at which receivers are supposed to defer (CCA level). According to certain aspects, the AP may signal deferral related information to be included in transmitted packets by the STA.

Another way to improve CCA behavior may be to define criteria for the deferral upon reception of a packet, for example, based on deferral related info included in a received packet and/or additional rules defined by the AP.

For example, a STA may be allowed to not defer to the received packet if packet matches one or more conditions. In some cases, a STA may be allowed to not defer to the received packet if the packet matches any condition related to the info included in the preamble. For example, conditions related to the information included in the preamble may include: whether a packet BSS identifier (BSSID) is from an OBSS or from certain selected OBSSs (e.g., the AP may provide a list), whether TX/RX identifiers match certain RX/TX identifier (e.g., which may be signaled by an AP), whether the TX power indicated in the packet is less than a value (e.g., indicated by the AP). In some cases, a STA may be allowed to not defer if the packet is from an OBSS. Allowed non deferral may only hold if the packet is from an OBSS. Non deferral can also be allowed if the overheard transmission is between two nodes, neither of which is the intended recipient of the desired transmission. In some cases, a STA may be allowed not to defer if an "importance" indication allows for it or if the STA is planning to use the medium for a transmission with a certain QoS (e.g., as compared to the QoS indication in the received packet).

In some cases, a STA may be allowed to not defer to the received packet if the packet matches one or more conditions related to additional information derived from the PHY preamble. For example, a STA may be allowed not to defer if receive power is below a certain threshold (e.g., indicated by the AP or in the standard), or if the bandwidth of the packet is within a certain range (e.g., indicated by AP), or if the MCS of the packet is within a certain range (e.g., indicated by AP), or if the duration of the packet is greater than some value (e.g., indicated by AP).

In some cases, a node may not defer to packets if the packets arrive within a certain time and/or frequency. For example, certain deferral rules can be defined to be valid only within a restricted access window (RAW). In other words, during the RAW, a STA may be able to not defer to packets of an OBSS.

In some cases, a STA may not defer to packets of a certain category (e.g., packets that meet a particular interference condition). In some cases, the STA may determine whether a packet is of a particular category. The category may be based on the receive signal strength indication (RSSI) of the received packet or the RSSI of transmission of the target destination of the received packet. The category may be based on a received signal strength indication (RSSI) with the STAs AP and/or based on RSSI with interferers (APs of OBSSs). The category may also be determined by the AP. Other types of categories may also be determined by the STA or AP.

According to certain aspects, a receiving STA (e.g., one of the STAs 256 illustrated in FIG. 3) may use information in the received packet and additional criteria received from its own AP (e.g., a one of the APs 254 illustrated in FIG. 3) to determine if a packet can be dropped. If the STA determines that a packet may be dropped, the STA may stop processing the packet after the information is determined (e.g., based on a PHY/MAC header) and may be allowed to transmit. Transmission may be allowed only with certain limitations. For example, transmission may be allowed within a certain duration (e.g., fixed and within the duration of the physical layer convergence procedure (PLCP) protocol data unit (PPDU) previously dropped). Transmission may be allowed with a certain maximum power. Transmission may be preceded by request to send (RTS) and/or clear to send (CTS) packet. Transmission may be allowed with a certain bandwidth. Transmission may be allowed with a certain destination.

According to certain aspects, APs may define deferral rules and communicate the deferral rules to STAs. The APs may also indicate to STAs how to set the deferral parameters to be inserted in each transmitted packet. The APs may coordinate the setting of the rules and the parameters. In some cases, an AP may signal any of the parameters needed for implementing the above rules in a beacon, probe response, association response, or in a management frame sent directly to the STAs. A negotiation procedure may be defined and initiated by an AP. For example, the AP may allow STAs to defer according to parameters the AP defines, or based on parameters determined by STAs.

In some cases, APs may coordinate in defining any of the parameters and rules listed above. For example, APs may coordinate regarding what information is to be included in a transmitted packet. As an example, APs may coordinate in an effort to ensure that BSSIDs are unique among each neighbor and to ensure that the importance (QoS) of packets (that may be used as a basis for a deferral decision) may be set fairly. APs may also coordinate which rules apply to which STAs and when to apply any of the conditions and/or deferral parameters listed above.

Example Deferral Based on BSSID Information

According to certain aspects, deferral rules may be based on BSS Identifier information in a packet. In dense scenarios (e.g., as illustrated in FIG. 2B), transmissions in one basic service (BSS) can be interfered by transmissions from overlapping BSSs (OBSSs). In some cases, the interfering transmissions from OBSSs may strong, such that a concurrent transmission may not be possible. In other cases, the OBSS interference may not be strong and concurrent transmission may be possible.

Certain stations (STAs) may not defer to packets from certain OBSSs, however, an STA intending to transmit to its serving access point (AP) typically defers to a packet that is sent by any other STA or AP within the BSS of the STA intending to transmit.

Therefore, it may be desirable to allow STAs not to defer to packets coming from certain OBSSs.

According to certain aspects, a STA (e.g., such as one of the STAs 256 illustrated in FIG. 3) may determine the BSSID of a packet. Packets carry an identifier of the BSS. The identifier should be unique among OBSSs. In certain systems (e.g., 802.11ac systems), the BSSID of uplink packets may be determined from the partial association identifier (partial_AID) field in the preamble of the packet. However, the BSSID of downlink packets may not be determined from the partial_AID field in the preamble. Ideally, the BSSID should be discernible from the preamble because decoding the actual packet may not be reliable.

Certain aspects of the present disclosure provide techniques and apparatus for including a BSSID in the preamble of downlink packets. According to certain aspects, partial_AID in high-efficiency wireless (HEW) packets may include certain bits as a BSSID and certain bits for a STA identifier. According to certain aspects, APs may jointly decide BSSIDs such that the BSSIDs do not overlap. In the uplink direction, the STA identifier may indicate the address of the transmitting STA. And in the downlink direction, the STA identifier may indicate the address of the receiving STA. According to certain aspects, a single bit may be used to indicate if the identifier is UL or DL, which may enable the STA to know how to use the Partial AID (e.g., to identify the transmitting STA address or receiving STA address).

According to certain aspects, AIDs may be assigned to STAs within a BSS such that when creating the partial_AID, certain last bits of the partial_AID may be the same. These bits can be used as the BSSID. According to certain aspects, one bit in the sig or the Q rail may specify whether an AP uses the encoding. The APs may jointly decide which bits are used for the BSSID such that there is not overlap.

According to certain aspects, if APs are coordinated, an AP identifier need not be the partial BSSID (which may conflict among neighbors), but could be any identifier agreed among neighboring APs. Alternatively, AID space may be partitioned among neighbors such that an AID implicitly identifies the BSS. In this case, the AP may indicate the partition to the STAs, so that the STAs know which AIDs to filter out.

Un-Coordinated Deferral Based on BSSID

Certain aspects provide for an example of un-coordinated deferral based on BSSID. For example, according to a first option, standard deferral may be used if a packet is from within the same BSS. In this case, the AP may indicate to STAs (e.g., in the BSS allowance) to not defer if a packet is any OBSS (or from a particular OBSS indicated by AP). The AP may indicate to STAs to not defer if a receiving STA belongs to a certain group of STAs that may be allowed to not defer to OBSS packets. Additionally or alternatively, the AP may indicate to STAs to not defer if they receive signal strength indication (RSSI) of the packet is below a certain value. According to certain aspects, the value may be indicated by the AP. Additionally or alternatively, the AP may indicate to STAs to not defer if RSSI is below a certain value, and the packet has a "need not defer" bit set. According to certain aspects, the transmitter of the packet decides whether or not to set the "need not defer" bit. To optimize behavior, APs may coordinate for selection of above parameters and/or STAs.

According to a second option for un-coordinated deferral based on BSSID, standard deferral may be used if a packet is from within BSS and modified deferral may be used if the packet is from an OBSS. For modified deferral, if the RSSI of an intended receiver of a packet is below a certain value, the STA may be allowed to not defer. Alternatively, STAs may be allowed not to defer if the RSSI of the packet is below a certain value and packet has a "need not defer" bit set.

According to certain aspects, both transmitter and receiver identifiers may be included in the Partial_AID field. This may enable nodes to keep track of RSSI measurements from other nodes in OBSSs. For example, since the packets will have transmitter identifiers, the node can measure RSSI of the transmitter for uplink packets and get RSSI values for both OBSS STAs and OBSS APs.

Coordinated Deferral Based on BSSID

Certain aspects provide for coordinated deferral based on BSSID. According to certain aspects, APs may coordinate in time. According to certain aspects, during different time periods, different deferral rules may be used. For example, during some time periods standard deferral rules may be used and during other time periods standard deferral rules may be used if a packet is from within the BSS but modified deferral rules may be used if a packet is from an OBSS. For example, the STAs may be allowed to not defer if the packet is from an OBSS. Alternatively, the STASs may defer only if the RSSI of the packet is above a threshold. Alternatively, STAs may be allowed to defer only if the RSSI at the intended receiver of packet is above a certain value.

According to certain aspects, STAs may be classified into different groups. According to certain aspects, different groups may be assigned different time periods and, hence, different deferral rules. For example, robust users may be given time slots with modified deferral rules and sensitive users may be given time slots with regular deferral rules. According to certain aspects, different time periods may also have additional bandwidth constraints.

According to certain aspects, APs may coordinate across frequency. According to certain aspects, different deferral rules may be used in different bandwidths. For example, standard deferral rules may be used in a first bandwidth and in a second bandwidth standard deferral may be used if the packet from within the BSS but modified deferral may be used if packet is from an OBSS. For example, in the second bandwidth, STAs may not defer if the packet is from an OBSS. Alternatively, in the second bandwidth STAs may be allowed to not defer only if the RSSI of the packet is below a threshold. Alternatively, in the second bandwidth STAs may be allowed to defer only if the RSSI at the intended receiver of the packet is above a certain value.

According to certain aspects, APs that coordinate across frequency may have multiple transmitter and receiver circuitry. According to certain aspects, for frequency coordinated deferral based on BSSID, STAs may be classified in different groups. Different groups may be assigned different bandwidths and, hence, different deferral rules.

Figure 5:
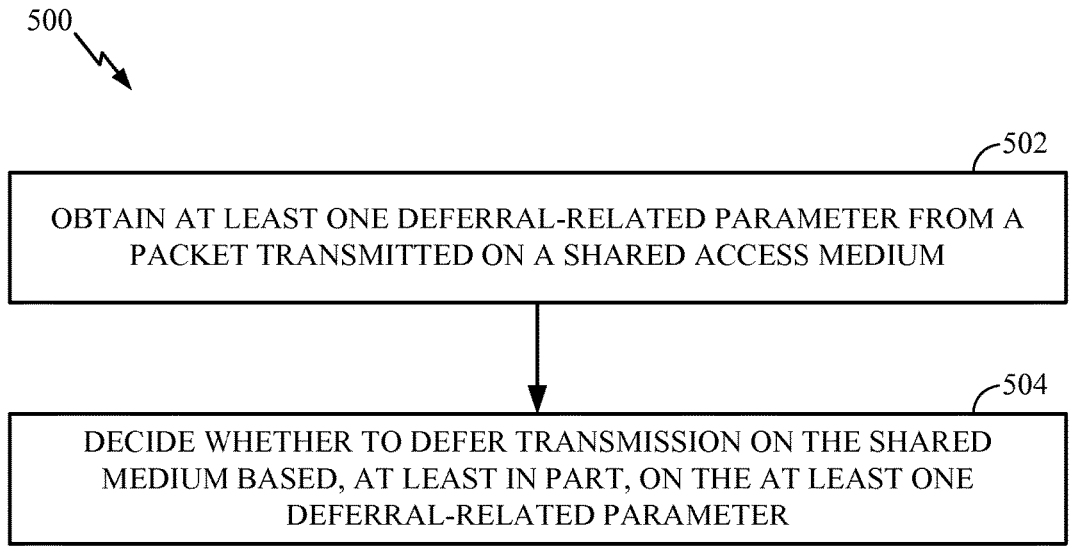
FIG. 5 illustrates example operations for wireless communications, in accordance with certain aspects of the present disclosure.

FIG. 5 illustrates example operations 500 for wireless communications, in accordance with certain aspects of the present disclosure. The operations 500 may be performed by an apparatus, for example, a STA (e.g., any of STAs 256 illustrated in FIG. 3). The operations 500 may begin, at 502, by obtaining, on a shared access medium, a packet having at least one deferral-related parameter.

At 504, the STA may decide whether to defer transmission on the shared access medium based, at least in part, on the deferral-related parameter. According to certain aspects, the STA may further decide based on a list of OBSSs and/or an indication (e.g., received in a beacon, a probe response, an association response, and/or a management frame) of which of the at least one deferral-related parameter to use in making the decision. According to certain aspects, the STA may use one or more threshold values associated with the at least one deferral-related parameter in making the decision. According to certain aspects, the decision may be based on the at least one deferral-related parameter and also based on at least one other parameter (e.g., a bandwidth of the packet, a MCS of the packet, and/or a duration of the packet).

According to certain aspects, the STA may determine an identifier of a BSS (e.g., BSSID) based on a Partial_AID. According to certain aspects, the STA may defer to packets from a BSS of which the apparatus is a member and not defer to packets from one or more OBSSs. Alternatively, the STA may defer to packets from a BSS of which the apparatus is a member and not defer to packets from the one or more OBSSs during a period.

Figure 6:
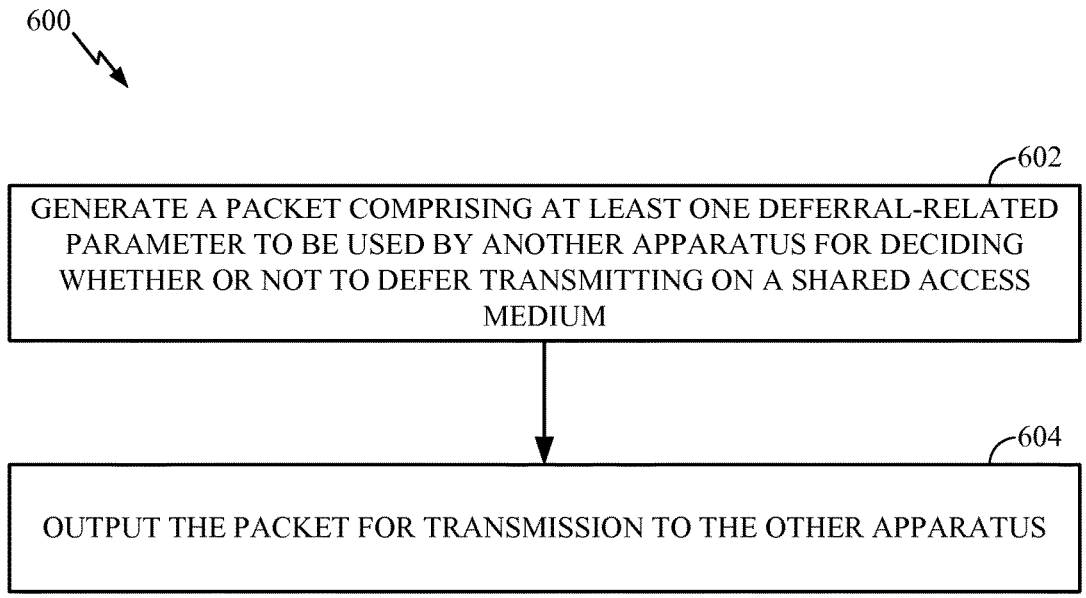
FIG. 6 illustrates example operations for wireless communications, in accordance with certain aspects of the present disclosure.
Figure 6A:
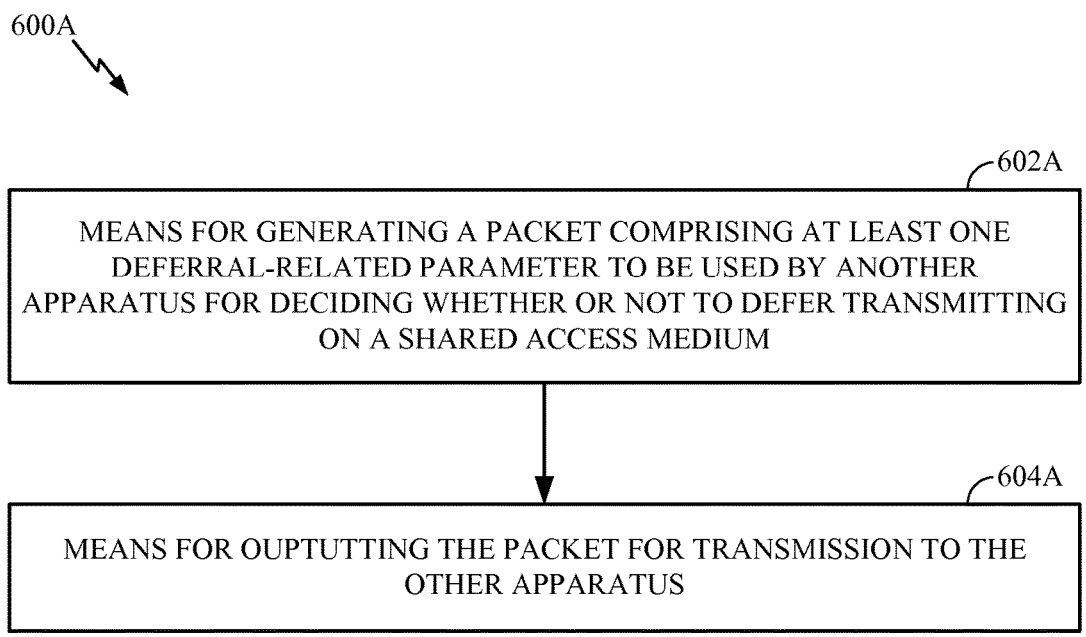
FIG. 6A illustrates example components capable of performing operations shown in FIG. 6, in accordance with certain aspects of the present disclosure.

FIG. 6 illustrates example operations 600 for wireless communications, in accordance with certain aspects of the present disclosure. The operations 600 may be performed by an apparatus, for example, an AP (e.g., such any of the APs 254 illustrated in FIG. 3). The operations 600 may begin, at 602, by generating a packet comprising (e.g., in the PHY preamble) at least one deferral-related parameter to be used by another apparatus (e.g., STA) for deciding whether or not the other apparatus should defer transmitting on a shared access medium. According to the certain aspects, the deferral-related parameter may include a BSSID, an identifier of a transmitter of the packet, and/or an identifier of the receiver of the packet. Additionally or alternatively, the deferral related parameter may include an indication of whether the packet requires deferral or an indication of a QoS of the packet. Additionally or alternatively, the deferral-related parameter may include a receive power level equal to or above which the other apparatus is supposed to defer after reception of the deferral-related parameter by the other apparatus.

According to certain aspects, the AP may generate a message signaling one or more threshold values of the deferral-related parameter for the other apparatus to use in making the decision. According to certain aspects, the AP may generate a message signaling a list of certain OBSSs for the other apparatus to use in making the decision by comparing a BSS identified by the identifier to BSSs in the list. According to certain aspects, the AP may generate a message signaling what type of deferral-related parameters are to be included in transmitted packets. According to certain aspects, the AP may transmit the message in at least one of a beacon, a probe response, an association response, or a management frame. According to certain aspects, the AP may transmit information regarding one or more rules to be used by the other apparatus in making the decision.

According to certain aspects, the AP may generate a partial_AID based, at least in part, on the BSSID of the BSS and may include the partial_AID in a preamble of the packet. The AID may have at least some bits as a BSSID and at least some bits for a STA identifier. Additionally, the AID may have at least some bits to be used for discriminating between uplink and downlink. According to certain aspects, the AP may coordinate with one or more other apparatuses (APs) to decide on non-overlapping BSSIDs. According to certain aspects, available AID values may be partitioned among neighbors, such that an AID implicitly identifies a corresponding BSS and the AP may generate a message indicating the partitioned AID space. According to certain aspects, for a communication from the apparatus to an AP, the STA identifier may indicate an address of a transmitting device. For a communication from the apparatus to a receiving station, the STA identifier may indicate an address of the receiving station. According to certain aspects, the AP may assign AIDs to STAs, such that when creating a partial_AID, at least some bits may be the same and can be used by a device to determine a BSSID.

At 604, the AP may output the packet for transmission to the other apparatus.

Figure 5A:
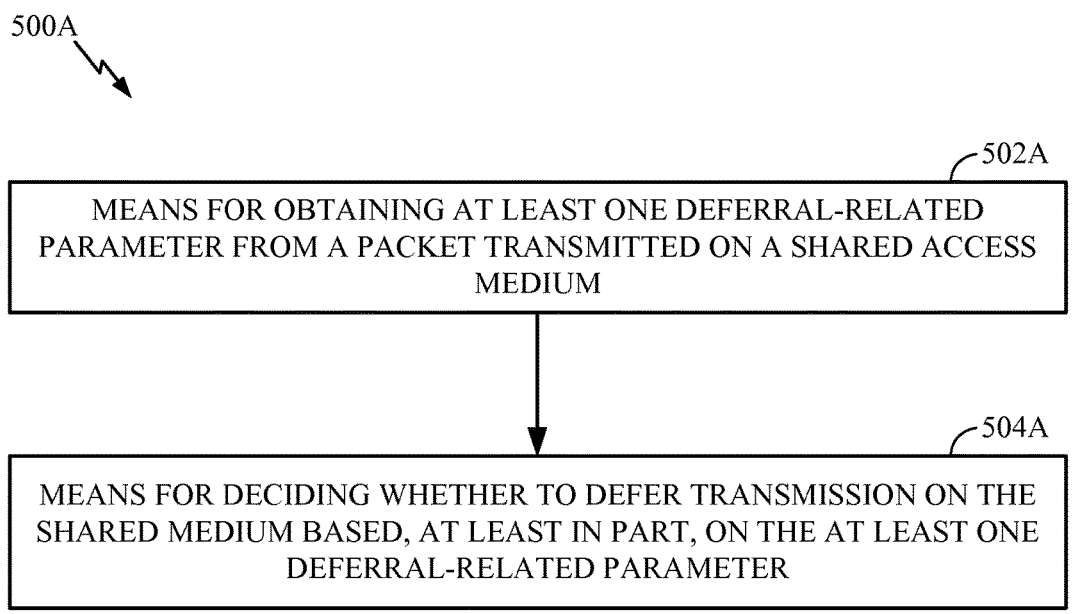
FIG. 5A illustrates example components capable of performing operations shown in FIG. 5, in accordance with certain aspects of the present disclosure.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500 and 600 illustrated in FIGS. 5 and 6 correspond to means 500A and 600A illustrated in FIGS. 5A and 6A.

For example, means for transmitting may comprise a transmitter (e.g., the transmitter 410) and/or an antenna(s) 416 of the wireless device 402 illustrated in FIG. 4. Means for receiving may comprise a receiver (e.g., the receiver 412) and/or an antenna(s) 416 of the wireless device 402 illustrated in FIG. 4.

In some cases, a receiver or means for receiving may not include "front-end" RF functions, but could include means for receiving a packet, for example, from an RF front end processor. According to certain aspects, an apparatus operating in accordance with aspects described herein may obtain a packet (or parameters contained therein) from such an RF front end processor. Similarly, a transmitter or means for transmitting may not include "front-end" RF functions, but could include means for providing a packet, for example, to an RF front end processor for transmission. According to certain aspects, an apparatus operating in accordance with aspects described herein may generate a packet (or parameters to be included in a packet) and provide the packet to an RF front end processor for transmission.

Means for deciding and means for generating may include one or more processors, such as the processor 404 illustrated in FIG. 4. According to certain aspects, such means may be implemented by processing systems configured to perform the corresponding functions by implementing various algorithms (e.g., in hardware or by executing software instructions). For example, an algorithm for deciding whether to defer may take, as input, the deferral-related parameter included in a packet and make a decision whether or not to defer based on that input. An algorithm for generating a packet having such a deferral-related parameter may take, as input, information that mandate a certain type of deferral or lack of deferral, and generate a packet with a corresponding deferral-related parameter.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. Thus, in some aspects, computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For example, instructions for obtaining a deferral-related parameter from a packet transmitted on a shared medium and instructions for deciding whether to defer transmission on the shared access medium based, at least in part, on the at least one deferral-related parameter. In another example, instructions for generating a packet comprising at least one deferral-related parameter to be used by another apparatus for deciding whether or not the other apparatus should defer transmitting on a shared medium and instructions for providing the packet to the other apparatus.

For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for wireless communications, comprising:
    at least one processor configured to:
        obtain, from a portion of a packet transmitted on a shared access medium, at least one deferral-related parameter;
        determine a basic service set (BSS) associated with the packet based, at least in part, on the at least one deferral-related parameter; and
        output another packet for transmission on the shared access medium during transmission of the packet when the determined BSS is one of one or more overlapping BSSs (OBSSs) in a list of OBSSs stored at the apparatus; and
    a memory coupled with the at least one processor.

2. The apparatus of claim 1, wherein the at least one processor is further configured to defer the transmission or output the other packet based further on one or more threshold values associated with the at least one deferral-related parameter.

3. The apparatus of claim 1, wherein the at least one deferral-related parameter comprises at least one of: a partial association identifier (AID) of a device that transmitted the packet, a partial AID of a device for which reception of the packet is intended, or a basic service set identifier (BSSID) of the packet, an indication of transmit power of the packet, an indication of whether the packet can be dropped, in indication of a quality of service (QoS) of the packet, or an indication of a receive power level at which the apparatus should defer.

4. The apparatus of claim 1, wherein the at least one processor is further configured to defer the transmission or output the other packet based further on an indication of which of the at least one deferral-related parameter to use.

5. The apparatus of claim 4, wherein the indication is received in at least one of a beacon, a probe response, an association response, or a management frame.

6. The apparatus of claim 1, wherein the at least one processor is further configured to defer the transmission or output the other packet based further on the at least one deferral-related parameter and at least one other parameter.

7. The apparatus of claim 6, wherein the at least one other parameter comprises at least one of a bandwidth of the packet, a modulation and coding scheme (MCS) of the packet, a duration of the packet, a receive signal strength indication (RSSI) of the packet, or a RSSI of a previous packet from a device that transmitted of the packet.

8. The apparatus of claim 1, wherein the at least one processor is further configured to determine an identifier of a basic service set (BSS) based on a partial association identification (AID) and to decide whether or not to defer based further on the identifier of the BSS.

9. The apparatus of claim 1, wherein the at least one processor is further configured to defer transmission on the shared access medium when the apparatus is a member of the determined BSS and output the other packet for transmission on the shared access medium when the determined BSS is of one or more OBSSs and when the transmission of packets from the one or more OBSSs are below an energy threshold.

10. The apparatus of claim 1, further comprising an antenna, wherein the apparatus is configured to obtain the at least one deferral-related parameter via the antenna, wherein transmitting on the shared access medium during transmission of packets from one or more OBSSs is performed via the antenna, and wherein the apparatus is configured as a station (STA).

11. The apparatus of claim 1, wherein the processing system is configured to defer transmission on the shared access medium during transmission of packets when the apparatus is a member of the determined BSS.

12. An apparatus for wireless communications, comprising:
at least one processor configured to:
generate a packet comprising at least one deferral-related parameter, including information for determining a basic service set (BSS) of the packet;
generate a first message signaling a list of overlapping BSSs (OBSSs);
generate a second message indicating that another apparatus should not defer transmission on the shared access medium when one or more packets received on the shared access medium are from one or more OBSSs in the list of OBSSs;
a memory coupled with the at least one processor; and
an interface configured to output the packet, the first message, and the second message for transmission to the other apparatus.

13. The apparatus of claim 12, wherein the at least one deferral-related parameter is included in a physical layer (PHY) preamble of the packet.

14. The apparatus of claim 12, wherein the at least one processor is further configured to generate a third message signaling one or more threshold values of the at least one deferral-related parameter for the other apparatus to use in deciding.

15. The apparatus of claim 12, wherein the at least one deferral-related parameter comprises at least one of an identifier of a basic service set (BSS), an identifier of a transmitter of the packet, or an identifier of a receiver of the packet.

16. The apparatus of claim 15, wherein the at least one deferral-related parameter comprises at least one of an indication of whether the packet requires deferral or an indication of a quality of service (QoS) of the packet.

17. The apparatus of claim 15, wherein the at least one deferral-related parameter comprises an indication of a receive power level equal to or above which the other apparatus is supposed to defer after reception of the deferral-related parameter by the other apparatus.

18. The apparatus of claim 15, wherein the at least one processor is further configured to generate a partial association identification (AID) based, at least in part, on the identifier of the BSS and include the partial AID in a preamble of the packet.

19. The apparatus of claim 18, wherein the partial AID has at least some bits as the identifier of the BSS and at least some bits for a station (STA) identifier.

20. The apparatus of claim 19, wherein the STA identifier comprises an address of the apparatus if the apparatus is communicating with an access point (AP).

21. The apparatus of claim 19, wherein the STA identifier comprises an address of an access point (AP) if the apparatus is communicating with the AP.

22. The apparatus of claim 18, wherein the partial AID has at least some bits to be used for discriminating between uplink and downlink.

23. The apparatus of claim 18, wherein different values of the partial AID identify different BSSs.

24. The apparatus of claim 12, wherein the at least one processor is further configured to generate a third message signaling what type of deferral-related parameters are to be included in transmitted packets.

25. The apparatus of claim 24, wherein:
the interface is further configured to output the third message for transmission via at least one of a beacon, a probe response, an association response, or a management frame.

26. The apparatus of claim 12, wherein the interface is further configured to provide information regarding one or more rules to be used by the other apparatus in deciding.

27. The apparatus of claim 12, wherein the at least one processor is further configured to coordinate with one or more other apparatuses to decide on non-overlapping identifiers of basic service sets (BSSs).

28. The apparatus of claim 12, further comprising an antenna, wherein the apparatus is configured to transmit the outputted packet via the antenna, and wherein the apparatus is configured as an access point (AP).

29. A method for wireless communications by an apparatus, comprising:
obtaining, from a portion of a packet transmitted on a shared access medium, at least one deferral-related parameter;
determining a basic service set (BSS) associated with the packet based, at least in part, on the at least one deferral-related parameter; and
transmitting on the shared access medium during transmission of the packet when the determined BSS is one of one or more overlapping BSSs (OBSSs) in a list of OBSSs stored at the apparatus.

30. A method for wireless communications, comprising:
generating a packet comprising at least one deferral-related parameter;
generating a first message signaling a list of overlapping BSSs (OBSSs);
generating a second message indicating that another apparatus should not defer transmission on the shared access medium when one or more packets received on the shared access medium are from one or more OBSSs in the list of OBSSs; and outputting the packet, the first message, and the second message for transmission to the other apparatus.

* * * * *